US009422885B2

(12) United States Patent
Prothmann et al.

(10) Patent No.: US 9,422,885 B2
(45) Date of Patent: Aug. 23, 2016

(54) METHOD FOR REDUCING THE PARTICLE EMISSION OF AN INTERNAL COMBUSTION ENGINE AND ENGINE CONTROLLER

(71) Applicant: MTU Friedrichshafen GmbH, Friedrichshafen (DE)

(72) Inventors: Michael Prothmann, Friedrichshafen (DE); Johannes Baldauf, Wangen (DE); Markus Fleckhammer, Friedrichshafen (DE)

(73) Assignee: MTU Friedrichshafen GmbH, Friedrichshafen (DE)

( * ) Notice: Subject to any disclaimer, the term of this patent is extended or adjusted under 35 U.S.C. 154(b) by 0 days.

(21) Appl. No.: 14/744,320

(22) Filed: Jun. 19, 2015

(65) Prior Publication Data
US 2015/0285180 A1    Oct. 8, 2015

Related U.S. Application Data

(63) Continuation of application No. PCT/EP2013/003464, filed on Nov. 18, 2013.

(30) Foreign Application Priority Data

Dec. 20, 2012 (DE) .......................... 10 2012 223 989

(51) Int. Cl.
*F02D 41/40* (2006.01)
*F02D 41/02* (2006.01)
(Continued)

(52) U.S. Cl.
CPC ............. *F02D 41/405* (2013.01); *F01N 9/002* (2013.01); *F02B 3/12* (2013.01); *F02D 41/008* (2013.01); *F02D 41/027* (2013.01);
(Continued)

(58) Field of Classification Search
CPC ..... F02D 41/027; F02D 41/405; F01N 9/002; F02B 3/10; F02B 3/12
USPC ...................... 701/105; 123/299; 60/285, 295
See application file for complete search history.

(56) References Cited

U.S. PATENT DOCUMENTS 6,651,613 B2    11/2003   Rodier
2002/0104312 A1*  8/2002  Hoffman ............... F02D 41/024
                                                    60/286

(Continued)

FOREIGN PATENT DOCUMENTS

DE      100 16 219 A1     2/2002
EP      1 132 584 A2      9/2001
JP      2006-105055 A     4/2006
WO      2005/001266 A1    1/2005

OTHER PUBLICATIONS

International Search Report dated Feb. 18, 2014 for International Application No. PCT/EP2013/003464 (6 pages).

*Primary Examiner* — Erick Solis
(74) *Attorney, Agent, or Firm* — Taylor IP, P.C.

(57) ABSTRACT

The present invention relates to a method for reducing the particle emissions of an internal combustion engine over its service life. The number of cylinders of the internal combustion engine in which post-injection is carried out is incrementally increased during the service life of the internal combustion engine. The increase in the number of cylinders receiving a post-injection may depend upon at least one parameter, which may be a running time, a distance performance, a particle concentration in exhaust gas, a load profile, or other parameter. The individual cylinders receiving post-injection may be changed to distribute wear.

16 Claims, 1 Drawing Sheet

(51) Int. Cl.
*F01N 9/00* (2006.01)
*F02B 3/12* (2006.01)
*F02D 41/00* (2006.01)
*F02D 41/38* (2006.01)

(52) U.S. Cl.
CPC .......... *F02D 41/0245* (2013.01); *F02D 41/402* (2013.01); *F02D 2041/389* (2013.01); *Y02T 10/44* (2013.01)

(56) References Cited

U.S. PATENT DOCUMENTS

| | | |
|---|---|---|
| 2002/0194837 A1 | 12/2002 | Fluga et al. |
| 2007/0000238 A1* | 1/2007 | Marlett ................ F01N 3/0253 60/286 |
| 2009/0090099 A1 | 4/2009 | Wu et al. |
| 2011/0173952 A1* | 7/2011 | Cassani ................ F01N 13/009 60/274 |

* cited by examiner

METHOD FOR REDUCING THE PARTICLE EMISSION OF AN INTERNAL COMBUSTION ENGINE AND ENGINE CONTROLLER

CROSS REFERENCE TO RELATED APPLICATIONS

This is a continuation of PCT application No. PCT/EP2013/003464, entitled "METHOD FOR REDUCING THE PARTICLE EMISSIONS OF AN INTERNAL COMBUSTION ENGINE AND ENGINE CONTROLLER", filed Nov. 18, 2013, which is incorporated herein by reference.

BACKGROUND OF THE INVENTION

1. Field of the Invention

The invention relates to a method for reducing particle emission of an internal combustion engine over its service life, as well as to an engine controller.

2. Description of the Related Art

With internal combustion engines there is generally a problem in that with increasing engine running time, in other words with increasing aging of the engine, higher particle emissions occur. This is at least partially due to the fact that the cylinders, due to symptoms of aging such as carbonization, are filled with a small amount of combustion air during an intake cycle. It is known to reduce particle emissions of internal combustion engines by performing a post-injection, whereby during the ignition cycle in a cylinder an additional fuel injection is performed after or during the actual torque-effective combustion. According to a first, however disputed theory, this post-injection causes soot particles to be created in the combustion chamber of the cylinder, which are discharged into the exhaust pipe to burn up into ash. According to a second theory, the exhaust gas temperature is raised due to the post-injection, thus making particle reduction in subsequent exhaust gas treatment more efficient.

It is disadvantageous that post-injection be carried out continuously over the entire service life of the internal combustion engine, as this leads to increased wear and tear of fuel injectors, making premature replacement of the same necessary, and resulting in shortened service life of the engine.

What is needed in the art is a method which makes it possible to reduce the particle emission that increases during the service life of an internal combustion engine, and at the same time keeps the wear and tear on the injectors as low as possible. Also needed in the art is an engine controller that is suitable for implementation of such a method.

SUMMARY OF THE INVENTION

The present invention provides a method for use in a number of cylinders of an internal combustion engine, in which method a post-injection is carried out, being gradually increased during the service life of the internal combustion engine. The number is gradually increased, preferably depending upon at least one parameter. This approach is based on the idea that particle emission typically increases steadily over the service life of the engine, so that it is not necessary to immediately at the beginning of the service life of the engine, in other words when it is in new condition, to pursue a maximum effort at reduction of particle emissions. Rather, it has been recognized that the amount of effort that is to be pursued for particle emissions can be gradually adapted to the particle emission that typically increases with engine service life. By gradually increasing the number of cylinders in which post-injection is performed, which are referred to herein as post-injecting cylinders or as cylinders with post-injection, a continuous post-injection over the entire service live of the internal combustion engine in all cylinders is avoided. Consequently, at least the injectors for cylinders in which no post-injection is performed are protected from excessive wear and tear. Accordingly as few cylinders as possible receive a post injection, whereby a sufficient reduction of particle emission is achieved. At the same time, adapting the number of the post-injecting cylinders to the service life of the internal combustion engine and to the increasing particle emission thereof allows an appropriate reduction according to the current requirement.

It is thus shown that the particle emissions that increase with the service life of the engine are partially or completely compensated for in that post-injection is selectively activated for certain cylinders. The term "service life" of the engine addresses its life span from initial start-up of the internal combustion engine through to its decommission.

Another method is provided in which no post-injection is performed in any of the cylinders when the internal combustion engine is in new condition. This is based on the idea that the internal combustion engine in its delivery state or new state only displays comparatively low particle emissions which do not need to be reduced through post-injection. It is thus possible, at least in a new condition of the internal combustion engine, to protect the injectors from additional wear due to a post-injection. In an alternative embodiment of the method, it is possible that with the engine in new condition a post-injection is performed in at least one cylinder. This may be done in order to reduce particle emissions even in new condition or in order to achieve another effect, in particular in regards to exhaust gas treatment. It is thereby possible that a regular post-injection as is generally known is provided for at least one cylinder. Based on the number of cylinders wherein post-injection is performed in new condition, a gradual increase during the service life of the internal combustion engine is then possible.

Another method is provided in which the number of post-injecting cylinders is gradually increased, depending on running time or operating time, in particular depending on a specific value of the running time of at least one engine component, possibly measured in hours of operation, on a distance performance, and/or on a value for a particle concentration in the exhaust gas. It is possible to use the running time, possibly measured in hours of operation, or the distance performance of the internal combustion engine as the at least one parameter, in order to gradually increase the number of post-injecting cylinders depending thereupon. Alternatively or in addition, it is possible to use the running time of at least one engine component as the at least one parameter. For example, the running time of at least one injector, possibly measured in hours of operation, can be considered. It is possible to consider the running time of several engine components as parameters, whereby the running time of all injectors of the internal combustion engine may be considered. Distance performance of the internal combustion engine may be used as a parameter, if the internal combustion engine drives a vehicle, so that it is meaningful to use the distance traveled by the vehicle as a measure of the aging of the internal combustion engine. It is possible therefore to state the distance performance, possibly in kilometers.

Alternatively, or in addition, it is possible to use a load profile of the internal combustion engine as a parameter. The concept of the load profile addresses in particular an overall output performance of the internal combustion engine in the course of its running time so far, up to a current considered point in time, or respectively an overall performance integrated over time. Thus an energy volume expended by the internal combustion engine so far may be measured in kilowatt-hours. A load profile may be used when the internal combustion engine is used in an application that includes a counter for capturing the expended performance, which may again be in kilowatt-hours. The use of a load profile as a parameter is based on the concept that signs of aging of the internal combustion engine appear sooner if the engine continuously operates at a higher performance or respectively is under greater load than would be the case if it operated continuously at a lower performance or respectively at lower load points. Alternatively or in addition, it is possible to use a value for a particle concentration in the exhaust gas as at least one parameter which is measured at time intervals, in particular at predetermined time intervals. In one embodiment of the method, the value for the particle concentration is measured continuously. The value may be measured with the assistance of a measuring device, for example a sensor or a measuring device that is based on scattered light.

It has been shown that it is not required that the gradual increase in the number of cylinders with post-injection during the service life of the internal combustion engine be time-dependent. Rather, it is possible to use a plurality of other parameters for the method that do not represent times, but are associated indirectly with the running time of the internal combustion engine or with the running time of components of same.

The number of post-injecting cylinders may be increased if a predetermined threshold value of the considered value or of the at least one parameter is reached or exceeded. For this purpose the at least one parameter may be captured continuously, or at regular time intervals and compared with the threshold value. It is thus possible that the number of the post-injecting cylinders is increased when the running time of at least one engine component, possibly the internal combustion engine itself, which may be measured in operating hours, reaches or exceeds a predetermined threshold value, in particular a predetermined number of operating hours. It is also possible to use a threshold value for distance performance, for the load profile and/or a threshold value for the particle concentration.

It is evident that the number of post-injecting cylinders may be increased not only once during the service life of the internal combustion engine, but several times. Therefore, several predetermined threshold values may be provided, whereby the number of post-injecting cylinders is further increased when reaching or exceeding said threshold values.

It is possible to increase the number of the post-injecting cylinders by one cylinder. Alternatively, it is possible to increase the number of the post-injecting cylinder by two or more cylinders. It is not mandatory that the number be increased by the same number of cylinders at each incremental increase. It is thus possible for example, initially based on the new condition of the internal combustion engine in which no post-injection occurs, to provide a post-injection in one single cylinder when a predetermined threshold value is reached or exceeded. When a subsequent threshold value is reached or exceeded it is possible to activate a post-injection, for example in two additional cylinders. Other sequences of incremental increases are possible as appropriate and are in particular coordinated to the typical increase of particle emissions for the specific internal combustion engine. Therefore only as few injectors as possible may receive a post-injection. The number of post-injecting cylinders is thus kept as low as possible. Increasing particle emissions may thereby not be over-compensated for.

Another method is provided in which the cylinders in which a post-injection is performed, in other words the post-injecting cylinders, are selected so as to be uniformly distributed over an entire ignition sequence of all cylinders. The cylinders of the internal combustion engine display a defined ignition sequence, wherein they are ignited one after the other from a first to a last cylinder. After the last cylinder, the first cylinder is again ignited. If the post-injecting cylinders are not distributed uniformly over the ignition sequence, this would result in clearly noticeable noise development and occurrence of torsional vibrations, because the torque developed in one operating cycle of the post-injecting cylinders is different from the torque developed in another operating cycle of the cylinders that are not post-injecting. The post-injecting cylinders are therefore distributed in the ignition sequence uniformly in such a way that between all pairs of successively igniting, post-injecting cylinders an equal number of cylinders that are not post-injecting are provided.

If, for example, an internal combustion engine with twelve cylinders is operated so that a post-injection is caused in two cylinders, then these are distributed over the entire ignition sequence so that five cylinders in which no post-injection occurs follow one cylinder that is post-injected. A post-injection is performed for example in the first and the seventh cylinder in the ignition sequence, whereas no post-injection is performed in the second to the sixth and eight to twelfth cylinders. If, in the example of the internal combustion engine with twelve cylinders, a post-injection is performed in four cylinders, preferably two cylinders that are not post-injected are always provided in the ignition sequence between the post-injected cylinders. The post-injecting cylinders in the ignition sequence are then for example the first, fourth, seventh and tenth cylinders.

Another method is provided in which, for a first cylinder in which a post-injection is performed, the post-injection is concluded after a predetermined, possibly adjustable time interval. Simultaneously the post-injection is activated for a second cylinder in which previously no post-injection was performed. According to the predetermined time interval the post-injecting cylinder is therefore exchanged the cylinder in which specifically the post-injection is performed is changed. This results in that the additional burden on the injectors due to the post-injection can be distributed over more than one cylinder, whereby the post-injection is not performed constantly in one and the same cylinder, so that the same injector does not receive excessive wear. Possibly a cylinder is selected as the second cylinder that directly follows the first cylinder or is immediately ahead of it in the ignition sequence. The implementation of the post-injection is thereby, viewed along the ignition sequence, moved by one position. This change may occur again after each new sequence of the predetermined time interval. In this way it is possible to switch cylinders as regularly as possible in regards to post-injection and to thus distribute the additional injector wear and tear uniformly over the entire combustion engine.

In this context a method is provided wherein after the predetermined time interval all post-injecting cylinders are changed and are consequently replaced by cylinders in which previously no post-injection was performed. In this case too, a successor may be determined for each post-injecting cylinder that, in the ignition sequence, is located immediately adjacent. The number of post-injecting cylinders is thereby maintained. Changing the number of the post-injecting cylinders therefore does not serve to increase the number of post-injecting cylinders, but a uniform distribution of the wear and tear of injectors.

In the example of an internal combustion engine with twelve cylinders where for example initially the first and the seventh cylinder are selected as post-injecting cylinders, these may be replaced after a predetermined time interval by the second and the eighth cylinder in the ignition sequence. After an additional predetermined time interval these may again be replaced by the third and ninth cylinder in the ignition sequence. These in turn may be replaced after the predetermined time interval by the fourth and the tenth cylinder which in turn may be replaced after the predetermined time interval by the fifth and the eleventh cylinder. Finally, after the predetermined time interval, the post-injection is deactivated in the fifth and the eleventh cylinder, whereby at the same time the post-injection is activated in the sixth and the twelfth cylinder. After a further elapse of the predetermined time interval the post-injection is again deactivated in the sixth and the twelfth cylinder, whereby it is simultaneously activated again in the first and the seventh cylinder.

Overall it has been shown that in this manner a rolling post-injection is realized, whereby the post-injecting cylinders are constantly switched, in order to distribute the injector wear and tear uniformly over the entire internal combustion engine, thus overall extending the service life of the injectors and thereby also that of the internal combustion engine.

The predetermined, possibly adjustable time interval may be selected the same for each change. In one embodiment of the method the time interval is at least 0.25 seconds to 2 minutes maximum, preferably at least 0.5 seconds to 1 minute maximum. The post-injecting cylinders are thereby in particular not switched after every injection event, but rather after a predetermined time interval which is measured so that it may include a multitude of injection events, or respectively work cycles or revolutions of the internal combustion engine.

It is possible that an increase in the number of post-injecting cylinders is scheduled such that it coincides with a change of the post-injecting cylinders. If thus a threshold value is reached or exceeded it may be provided that, based in this point in time a waiting time is introduced until the predetermined time interval ends and the post-injecting cylinders are changed. The number of post-injecting cylinders can at the same time be increased. Alternatively it is possible to shorten or extend the predetermined time interval when reaching or exceeding the threshold value, in particular to immediately perform the change including the increase in the number of the post-injecting cylinders. Alternatively it is possible that the increase in the number of the post-injecting cylinders is implemented independent of the change of the post-injecting cylinders.

Another method is provided in which an efficiency of the internal combustion engine is calculated, depending on the number of the post-injecting cylinders. A characteristic diagram is hereby used for an engine control which is dependent on the actual current efficiency. It has been shown that the efficiency of the internal combustion engine decreases as soon as a post-injection is performed in a cylinder. To determine this efficiency, the fuel amount supplied to a cylinder per work cycle is considered in relation to the torque produced in the cylinder or respectively the performance output by the cylinder. Since the post-injection occurs at a point in time, measured in crankshaft degrees, wherein combustion of the post-injected fuel cannot achieve a torque effect, or only a slight torque effect, the efficiency of a post-injecting cylinder and thereby also the overall efficiency of the internal combustion engine is consequently reduced. If therefore, at activation of the post-injection a performance of the internal combustion engine is to be maintained, an increased amount of fuel must be supplied to at least the post-injecting cylinder.

A fuel amount supplied to a cylinder per work cycle is therefore adjusted depending on the actual current efficiency, in particular on the basis of the characteristics diagram assigned to this efficiency. It is thereby possible to adjust the fuel amount for only the post-injecting cylinders. Alternatively, it may be provided that the fuel amount is adjusted for all cylinders. The loss in the efficiency of the internal combustion engine caused by post-injection can thereby be divided by the total number of cylinders, whereby each cylinder, regardless of whether it is a post-injecting cylinder or is not a post-injecting cylinder, can be supplied with an accordingly increased fuel amount. It is thus possible to compensate the loss in efficiency through a fuel amount that is homogeneous and uniformly distributed across the entire internal combustion engine.

It is essential for proper operation of the internal combustion engine that for each point in time of the operation a characteristics diagram for the engine control is selected that is consistent with the actual current efficiency. In particular, the internal performance or respectively the torque captured in the engine controller must correspond to the real output performance. Otherwise, in particular on a torque regulated internal combustion engine, other operating parameters such as for example start of injection or injection pressure would be changed based on an incorrect characteristics diagram, so that although the engine is still in a position to maintain an adjustable desired speed, it could no longer maintain predefined exhaust gas values. With the assistance of the correct characteristics diagram which is consistent with the actual current efficiency, it is possible on the other hand to adjust the fuel amount that is supplied to a cylinder per work cycle, in particular so that a change of other operating parameters is avoided within the same load point. It is then possible, to regulate in particular the speed of the engine to a desired value and to maintain predefined exhaust gas values in spite of the changed efficiency.

A method is provided in this context that is characterized in that the efficiency is calculated according to the following equation:

$$\eta = a(1-K) + bK$$

$\eta$ hereby identifies the current efficiency of the internal combustion engine by taking into consideration the actual number of post-injecting cylinders. Parameter a identifies the efficiency of the internal combustion engine at a point in time when no post-injection is performed in any of the cylinders, and parameter b identifies the efficiency of the internal combustion engine in an operational state when a post-injection is performed in all cylinders. Parameter K identifies the quotient from the number of post-injecting cylinders, divided by the total number of cylinders of the internal combustion engine.

It is readily demonstrated that parameter K=0 if, especially in new condition, in an internal combustion engine no post-injection is performed in any of the cylinders. In this case, the actual efficiency $\eta$ is consistent with parameter a. If, in contrast, a post-injection is activated in all cylinders of the internal combustion engine, then the value of quotient K=1. In this case, the actual efficiency $\eta$ is consistent with parameter b. The calculation is based on the assumption that there is a linear correlation between the number of post-injecting cylinders and the efficiency of the internal combustion engine. The characteristics diagram of the internal combustion engine is selected according to the efficiency that is calculated based on the above equation.

Another method is provided in which, depending on the number and/or type of activated turbochargers, different characteristics diagrams are used for the internal combustion engine. In particular, the value of parameter a and also the value of internal combustion engine b, in other words the efficiencies for the internal combustion engine in the operating state in which no post-injection is performed in any of the cylinders, and for the internal combustion engine in the operating state in which a post-injection is performed in all cylinders, are selected differently depending on the number and/or type of activated turbochargers, thus a different turbocharger condition. The efficiency of the internal combustion engine depends substantially on the condition of the turbocharger, for example on how many and/or what type of turbochargers, for example high pressure or low pressure turbochargers, are activated in a two- or multi-stage charge. Here, the position of a valve may also be considered which allows flow from a high pressure turbocharger to a low pressure turbocharger, thus a so-called waste gate or respectively a high pressure turbine-bypass. Thereby a separate efficiency and thus a separate characteristics diagram is used for each turbocharger status for engine control or engine adjustment.

The present invention also provides an engine control unit for an internal combustion engine that is equipped to implement a method according to one of the previously described embodiments. Thus, advantages in connection with the engine controller are realized, that were previously explained in regard to the method.

The method and the engine controller allow the internal combustion engine to maintain particulate emissions within permissible limits without having to provide a particle filter at all, or at least without requiring an additional or larger particle filter.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention, in one form, and such exemplification is not to be construed as limiting the scope of the invention in any manner.

DETAILED DESCRIPTION OF THE INVENTION

Figure 1:
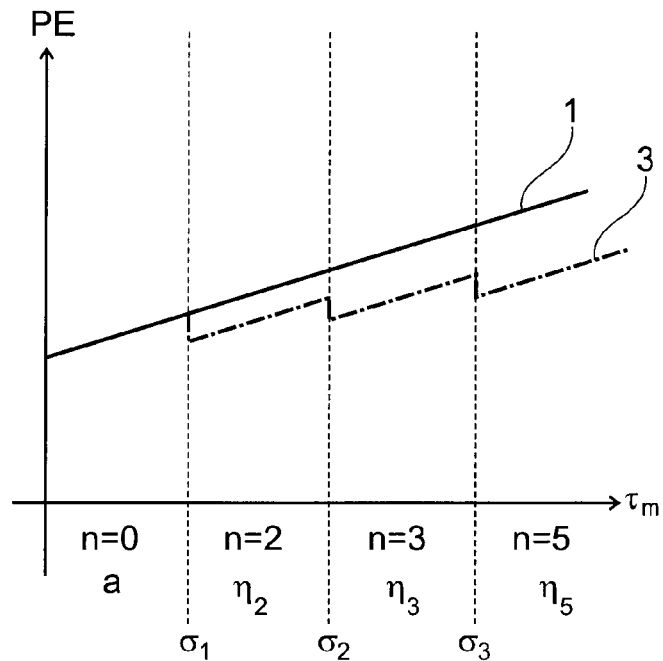
FIG. 1 shows a schematic diagrammatic illustration of particle emissions, plotted against engine running time and without implementation of the method.

FIG. 1 shows a diagrammatic illustration of particle emissions (PE) of an internal combustion engine, plotted against a running time $\tau_m$ of the internal combustion engine. Solid line 1 describes the development of particle emissions based on the aging of the internal combustion engine if no measures for reduction have been taken, in particular without implementation of the herein provided method. Based on particle emissions in an internal combustion engine in new condition which is shown at $\tau_m=0$ in the illustrated coordinate system, the particle emission increases continuously with the running time, in this case substantially linearly.

Running time $\tau_m$ of the internal combustion engine is divided into running time periods which are differentiated from each other by predefined threshold values $\sigma$. Shown in FIG. 1 are threshold values $\sigma_1$, $\sigma_2$, $\sigma_3$ through which four segments of the running time $\tau_m$ are demarcated from each other.

From the new condition of the internal combustion engine to the point in time at which the running time $\tau_m$ reaches or exceeds the first predefined threshold value $\sigma_1$, no post-injection is performed in any of the cylinders in the embodiment of the method that is illustrated in FIG. 1. Accordingly a number n of post-injecting cylinders of the internal combustion engine is equal to zero. The efficiency of the internal combustion engine is consistent here with a parameter a, whereby its specific value is again dependent on a turbocharger condition, in particular on a number and/or type of activated turbochargers. After reaching or exceeding the first threshold value $\sigma_1$, the number n is increased to two in the illustrated embodiment of the method. Consequently a post-injection is performed in two cylinders of the internal combustion engine. These may be distributed uniformly over an entire ignition sequence of all cylinders. In particular, the cylinders in which a post-injection is performed change, possibly in predefined time intervals, thus performing a rolling post-injection.

Due to the post-injection, the particle emission reduces dramatically in point of time $\sigma_1$, and then subsequently increases again steadily, in this case substantially linearly, due to aging of the internal combustion engine. The progression of the particle emission when implementing the herein suggested method is described in FIG. 1 by a dot-dashed curve 3. If a post-injection is performed in two cylinders, the internal combustion engine has an efficiency $\eta_2$, whose specific value is again dependent on a turbocharger condition.

If the service life $\tau_m$ of the internal combustion engine reaches or exceeds a second threshold value $\sigma_2$, the number n of injecting cylinder is increased by 1 in the illustrated example, so that it is now 3. Accordingly, the particle emission reduces again drastically in point in time $\sigma_2$, after which it increases again, in this case substantially linearly, due to aging. If a post-injection is performed in three cylinders, the internal combustion engine has an efficiency $\eta_3$, whose specific value is again dependent on a turbocharger condition.

If running time $\tau_m$ of the internal combustion engine reaches or exceeds a third threshold value $\sigma_3$, the number n is increased by two cylinders, so that it is now five. The particle emissions reduces again drastically in point of time $\sigma_3$, after which it increases again, in this case in particular substantially linearly, due to aging. With five post-injecting cylinders, the internal combustion engine has an efficiency $\eta_5$ that again is dependent on a turbocharger condition in regard to its specific value.

It is possible to continue the method until either a predetermined maximum running time of the internal combustion engine is reached, or until a post-injection is performed in all cylinders of the internal combustion engine. When this operational state is reached it is subsequently obviously no longer possible to further increase the number n=N of cylinders in which a post-injection is performed.

It is made clear by FIG. 1 that the increments in the number n when reaching or exceeding the predetermined threshold values do not need to be identical. However, embodiments of the method are conceivable wherein the increments are identical or wherein increments are selected that deviate from those illustrated here. The number of post-injecting cylinders is increased gradually during the running time of the internal combustion engine, in order to reduce the particle emission that increases with the running time $\tau_m$, whereby as few injectors as possible perform a post-injection.

The post-injecting cylinders may be switched after expiration of predetermined time intervals, so that a rolling post-injection is realized and additional wear of the injectors due to the post-injection is distributed uniformly over the entire combustion engine.

In the method illustrated in FIG. 1, the number n is increased exclusively depending upon the running time, whereby the running time is measured in operating hours or as distance performance. Alternatively or in addition it is possible to make the number n dependent on particle concentration in the exhaust gas, whose value may be measured in predetermined time intervals, or may be measured continuously. Hereby it is also possible to define predetermined threshold values. When reaching or exceeding these, the number n is increased by a predetermined increment or one that is dependent on the value of particle concentration. Moreover it is possible to increase the number n, depending on the running time of at least one engine component, possibly at least one injector, in dependency on a distance performance and/or a load profile. In all embodiments it is provided to define predetermined threshold values, whereby the number n is increased when reaching or exceeding them.

Figure 2:
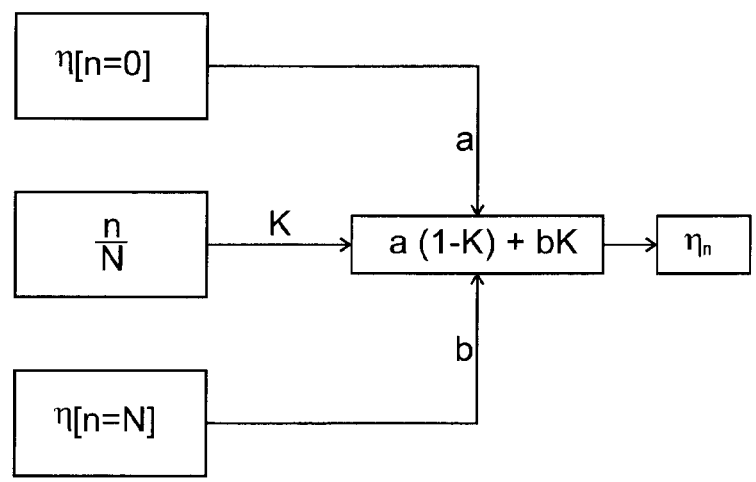
FIG. 2 shows a schematic diagram illustration of the calculation of an efficiency of the internal combustion engine, depending on the number of post-injecting cylinders.

FIG. 2 is a diagrammatic depiction of the calculation of a momentary efficiency of the internal combustion engine, dependent upon the number n. Initially, dependent upon a turbocharger condition, an efficiency $\eta[n=0]$ of the internal combustion engine is calculated for the operating condition in which no post-injection is performed for any cylinder. The value of this efficiency is equal or proportional to the value of a parameter a, which is the basis for further calculation. Accordingly, a value for a parameter b is determined equal or proportional to an efficiency $\eta[n=N]$, which is dependent on a specific turbocharger condition, for the operating condition of the internal combustion engine where a post-injection is performed in all cylinders whose total number is identified by N. Parameter b is also included in the following calculation. A quotient K is calculated for the currently prevailing operating condition which results from the number n of post-injecting cylinders, divided by the total number N of all cylinders of the internal combustion engine.

The efficiency of the currently prevailing operating condition is calculated with a number n of post-injecting cylinders according to formula $a(1-K)+bK$, thus according to the above given formula. It is therefore understood that a linear correlation exists between the efficiency $\eta_n$ and the number n of post-injecting cylinders.

Based on the herein described correlations it is also clear that the efficiency $\eta_n$ is dependent on a turbocharger condition of the internal combustion engine. This is considered in that the values for parameters a and b are selected depending on the number and/or type of activated turbochargers.

Overall it is therefore possible in any operating condition of the internal combustion engine to refer back to a characteristics diagram which is based on the current actual efficiency of the internal combustion engine. In this manner the amount of fuel that is supplied to the cylinders per work cycle can be adjusted depending on the actual efficiency $\eta_n$ in such a way that at the same load point a change of other parameters, for example start of injection or an injection pressure is avoided. It is therefore possible to always realize the same predetermined exhaust gas values in identical load points in spite of a change in the number n and/or a change of the turbocharger condition of the internal combustion engine.

Overall it is possible with the assistance of this method to reduce age-related particle emissions of the internal combustion engine while largely avoiding injector wear and tear. It is thereby possible to also maintain a particulate emissions within permissible values in the internal combustion engine, without having to provide a particle filter at all, or at least without requiring an additional or larger particle filter.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for reducing particle emission of an internal combustion engine over its service life, said method comprising:
   gradually increasing over the service life of said internal combustion engine a number of cylinders of said internal combustion engine in which a post-injection is carried out.

2. A method for reducing particle emission of an internal combustion engine over its service life, said method comprising:
   gradually increasing over the service life of said internal combustion engine a number of cylinders of said internal combustion engine in which a post-injection is carried out;
   said gradual increase of said number of cylinders of said internal combustion engine with said post-injection depending on a considered value of at least one of:
   a running time of said internal combustion engine;
   a running time of at least one engine component;
   a distance performance;
   a load profile; and
   a particulate concentration in the exhaust gas, said particle concentration being measured one of:
   in time intervals; and
   continuously; and
   said gradual increase of said number of cylinders of said internal combustion engine with said post-injection occurring when a predetermined threshold value of said considered value is reached or exceeded.

3. The method according to claim 2, wherein:
   the cylinders in which said post-injection is performed are selected uniformly distributed over an entire ignition sequence of all of said number of cylinders.

4. The method according to claim 2, wherein:
   for a first cylinder in which said post-injection is performed, said post-injection is concluded after a predetermined time interval;
   said post-injection is simultaneously activated for a second cylinder in which previously no post-injection was performed;
   said second cylinder being adjacent to said first cylinder in an ignition sequence of all of said number of cylinders; and
   whereby preferably a cylinder is selected as second cylinder that directly follows the first cylinder or is immediately ahead of it in the ignition sequence.

5. The method according to claim 4, wherein:
   after said predetermined time interval all cylinders in which said post-injection is performed are replaced by cylinders in which previously no said post-injection was performed; and
   said number of thereby in which said post-injection is performed is maintained.

6. A method for reducing particle emission of an internal combustion engine over its service life, said method comprising:
- gradually increasing over the service life of said internal combustion engine a number of cylinders of said internal combustion engine in which a post-injection is carried out, wherein:
- an actual current efficiency of said internal combustion engine is calculated, said calculated efficiency depending on said number of cylinders receiving said post-injection;
- a characteristic diagram is used for an engine control, said characteristic diagram being dependent on said actual current efficiency of said internal combustion engine;
- a fuel amount supplied to at least one cylinder of said internal combustion engine is adjusted depending upon said actual current efficiency of said internal combustion engine, said at least one cylinder being one of:
- at least one of said number of cylinders receiving said post-injection;
- all of said number of cylinders receiving said post-injection; and
- all of said cylinders of said internal combustion engine; and
- a change of other operating parameters being avoided for a given load point of said internal combustion engine.

7. The method according to claim 6, wherein:
- said actual current efficiency being calculated according to equation $\eta=a(1-K)+bK$, wherein:
- $\eta$ identifies said current efficiency of said internal combustion engine;
- a identifies an efficiency of said internal combustion engine at a point in time when no post-injection is performed in any of said cylinders;
- b identifies an efficiency of said internal combustion engine when a post-injection is performed in all of said cylinders; and
- K identifies a quotient from said number of said cylinders receiving said post-injection, divided by the total number of said cylinders of said internal combustion engine.

8. The method according to claim 7, wherein:
- selection of said efficiency of said internal combustion engine at a point in time when no post-injection is performed in any of said cylinders and selection of said efficiency of said internal combustion engine when a post-injection is performed in all of said cylinders depends on one of:
- a number of activated turbochargers; and
- a type of activated turbochargers.

9. An engine controller for an internal combustion engine, said engine controller implementing a series of steps, said series of steps comprising:
- gradually increasing over the service life of said internal combustion engine a number of cylinders of said internal combustion engine in which a post-injection is carried out.

10. An engine controller for an internal combustion engine, said engine controller implementing a series of steps, said series of steps comprising:
- gradually increasing over the service life of said internal combustion engine a number of cylinders of said internal combustion engine in which a post-injection is carried out;
- said gradual increase of said number of cylinders of said internal combustion engine with said post-injection depending on a considered value of at least one of:
- a running time of said internal combustion engine;
- a running time of at least one engine component;
- a distance performance;
- a load profile; and
- a particulate concentration in the exhaust gas, said particle concentration being measured one of:
- in time intervals; and
- continuously; and
- said gradual increase of said number of cylinders of said internal combustion engine with said post-injection occurring when a predetermined threshold value of said considered value is reached or exceeded.

11. The engine controller according to claim 10, wherein:
- the cylinders in which said post-injection is performed are selected uniformly distributed over an entire ignition sequence of all of said number of cylinders.

12. The engine controller according to claim 10, wherein:
- for a first cylinder in which said post-injection is performed, said post-injection is concluded after a predetermined time interval;
- said post-injection is simultaneously activated for a second cylinder in which previously no post-injection was performed;
- said second cylinder being adjacent to said first cylinder in an ignition sequence of all of said number of cylinders; and
- whereby preferably a cylinder is selected as second cylinder that directly follows the first cylinder or is immediately ahead of it in the ignition sequence.

13. The engine controller according to claim 12, wherein:
- after said predetermined time interval all cylinders in which said post-injection is performed are replaced by cylinders in which previously no said post-injection was performed; and
- said number of thereby in which said post-injection is performed is maintained.

14. An engine controller for an internal combustion engine, said engine controller implementing a series of steps, said series of steps comprising:
- gradually increasing over the service life of said internal combustion engine a number of cylinders of said internal combustion engine in which a post-injection is carried out, wherein:
- an actual current efficiency of said internal combustion engine is calculated, said calculated efficiency depending on said number of cylinders receiving said post-injection;
- a characteristic diagram is used for an engine control, said characteristic diagram being dependent on said actual current efficiency of said internal combustion engine;
- a fuel amount supplied to at least one cylinder of said internal combustion engine is adjusted depending upon said actual current efficiency of said internal combustion engine, said at least one cylinder being one of:
- at least one of said number of cylinders receiving said post-injection;
- all of said number of cylinders receiving said post-injection; and
- all of said cylinders of said internal combustion engine; and
- a change of other operating parameters being avoided for a given load point of said internal combustion engine.

15. The engine controller according to claim 14, wherein:
- said actual current efficiency being calculated according to equation $\eta=a(1-K)+bK$, wherein:
- $\eta$ identifies said current efficiency of said internal combustion engine;
- a identifies an efficiency of said internal combustion engine at a point in time when no post-injection is performed in any of said cylinders;

b identifies an efficiency of said internal combustion engine when a post-injection is performed in all of said cylinders; and K identifies a quotient from said number of said cylinders receiving said post-injection, divided by the total number of said cylinders of said internal combustion engine.

16. The engine controller according to claim 15, wherein:

selection of said efficiency of said internal combustion engine at a point in time when no post-injection is performed in any of said cylinders and selection of said efficiency of said internal combustion engine when a post-injection is performed in all of said cylinders depends on one of:

a number of activated turbochargers; and a type of activated turbochargers.

\* \* \* \* \*